(12) United States Patent
Nothofer et al.

(10) Patent No.: US 6,588,982 B2
(45) Date of Patent: Jul. 8, 2003

(54) METHOD OF LAYING A CABLE OR PIPE

(75) Inventors: Klaus Nothofer, Erkrath (DE); Hans-Detlef Leppert, Mönchengladbach (DE); Hans-Jürgen Lysson, Korschenbroich (DE); Wolfgang Teschner, Wunstorf (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/058,803

(22) Filed: Jan. 30, 2002

(65) Prior Publication Data

US 2002/0106248 A1 Aug. 8, 2002

(30) Foreign Application Priority Data

Feb. 8, 2001 (DE) .......................................... 101 05 735

(51) Int. Cl.$^7$ .............................. B08B 9/023; H02G 9/06
(52) U.S. Cl. ................... 405/184.1; 405/184.2; 405/183.5; 405/184
(58) Field of Search .................... 405/183.5, 184, 405/184.1, 184.2, 154.1

(56) References Cited

U.S. PATENT DOCUMENTS

| | | | | |
|---|---|---|---|---|
| 2,460,989 A | * | 2/1949 | Kraner | 451/76 |
| 3,362,109 A | * | 1/1968 | Wallace | 118/307 |
| 4,715,747 A | * | 12/1987 | Behrens | 405/183.5 |
| 4,756,510 A | * | 7/1988 | Klamm et al. | 405/183.5 |
| 4,856,937 A | * | 8/1989 | Grocott et al. | 405/183.5 |
| 5,011,332 A | * | 4/1991 | Kunze et al. | 405/183.5 |
| 5,216,849 A | * | 6/1993 | Clack et al. | 15/104.04 |
| 6,198,871 B1 | * | 3/2001 | Gregor et al. | 385/134 |

FOREIGN PATENT DOCUMENTS

| | | |
|---|---|---|
| DE | 30 02 226 A1 | 8/1980 |
| DE | 297 22 107 U1 | 3/1998 |
| DE | 298 21 504 U1 | 3/1999 |

* cited by examiner

*Primary Examiner*—Heather Shackelford
*Assistant Examiner*—Frederick Lagman
(74) *Attorney, Agent, or Firm*—Sughrue Mion, PLLC

(57) ABSTRACT

In a method of laying a cable, or a pipe for the subsequent introduction of a cable, in a fresh-water conduit, the surface of the cable or pipe is cleaned during the laying process immediately before entering the fresh-water conduit.

11 Claims, 1 Drawing Sheet

METHOD OF LAYING A CABLE OR PIPE

TECHNICAL FIELD OF THE DESCRIPTION

The invention relates to a method of laying a cable or pipe in a fresh-water conduit and a device for performing the said method. The invention is based on a priority application DE 101 05 735.0 which is hereby incorporated by reference.

BACKGROUND OF THE INVENTION

In the course of the setting-up of new cable installations for telecommunication purposes by regional and local enterprises, alternative solutions to the conventional laying of telecommunications cables directly in the ground are increasingly being considered for economic and/or organisational reasons. An alternative laying technique for telecommunications cables which enters into consideration, in particular for economic reasons, is the use of gas and water conduits which are present in the pipe or duct network belonging to a supply system in a town or village.

A solution of this kind is described in DE 30 01 226 A1. Apart from the reduction in the costs for the setting-up of an urban or regional telecommunications network, as a result of using the existing conduits, excavating operations are only required on a minor scale, so that there is little impairment of the traffic space, which is often limited, particularly in towns. In addition, in the case of this new laying technique, the occupation, which may already be dense in many cases, of routes by conduits belonging to all the supply and waste-disposal departments does not represent any substantial problem, but may even be of advantage.

For the setting-up of a telecommunications network using optical cables having a comparatively small external diameter, including the possibility of connection for subscribers who are to be connected up later, the laying of optical communications cables in fresh-water conduits belonging to the existing supply network therefore enters into consideration for technical and organisational reasons as well as for reasons connected with right of way. In that connection, the greatest importance is to be attached to the neutrality of the cable material, in particular the cable sheath, in respect of drinking water, and also to longitudinal watertightness and permanently secure closure of the cable to permeation by water vapour. Furthermore, when introducing the cable into the conduit, particular care must be taken to ensure that no germ-development or other microbiological contaminations occur in the conduit.

An additional difficulty in the laying of cables in drinking-water conduits consists in the fact that slide valves or other shut-off devices for shutting off the fresh-water conduit are disposed in the said drinking-water conduits at intervals of about 150 to 250 m. At these shut-off points, the cable has to be guided round the slide valve without any adverse effects of a mechanical or optical kind, by guiding the said cable out of the tubular conduit before the slide valve, and guiding it into the said conduit again after the slide valve. In addition, an optical cable also has to be guided out of, or into the tubular conduit for the setting-up of subscriber connections or branches.

DE 297 22 107 U1 describes a device for guiding a cable, in particular an optical communications cable, into and/or out of a fresh-water conduit. This device has a flange-like housing fastened to the fresh-water conduit, at least one guide pipe, which is disposed in the housing and projects into the conduit, for guiding the cable through a continuous bore passing through the wall of the conduit, and at least one sealing element which is disposed in the housing and tightly encloses the cable guided through.

In this device, it can happen under certain circumstances that, particularly after installation, air accumulates, in the form of air cushions which cannot escape, in that upper end of the guide pipe which projects into the housing. This permanently stagnant air promotes the multiplication of bacteria in the guide pipe. These stagnant air cushions should be avoided, without fail, in fresh-water or drinking-water conduits.

In DE-U-29 821 504, this problem is solved through the fact that the guide pipe has, at its end that projects into the housing, at least one aperture that passes through its wall. Because of the bore that passes through the wall of the guide pipe, air is able to escape from that upper end of the said guide pipe that projects into the housing, and the fresh water transported in the conduit is able to fill up the entire guide pipe. In this way, the accumulation of permanently stagnant air and the formation of an air cushion in the guide pipe, which promote the multiplication of bacteria, are reliably avoided.

In the known proposals, it is not possible to avoid germs, bacteria and other contaminants entering fresh-water conduits.

SUMMARY OF THE INVENTION

The underlying object of the present invention is therefore to improve the method initially mentioned in such a way that the introduction of germs, bacteria and contaminants is avoided to a very great extent.

This object is achieved by a Method of laying a cable, or a pipe for the subsequent introduction of a cable, in particular an optical communications cable, in a fresh-water conduit. Said method comprises the step of cleaning the surface of the cable or pipe is cleaned during the laying process immediately before entering the fresh-water conduit.

According to a particularly advantageous refinement of the invention, provision is made for cleaning to be performed with a liquid, preferably water, which is directed onto the surface of the cable or pipe under high pressure. The surface of the cable or pipe may alternatively, or even additionally, be cleaned with rotating brushes. These mechanical modes of operation make it possible to remove dirt and dust. In order to remove greases or other organic substances located on the surface of the cable or pipe, it is appropriate, or rather necessary, to add suitable solvents to the liquid, but these should be water-soluble and not contaminate the drinking water. After this coarse mechanical treatment, the surface of the cable or pipe is intensively rinsed in order to rinse off residues of dust and dirt and also solvents.

BRIEF DESCRIPTION OF THE DRAWINGS

The invention is explained with the aid of the exemplified embodiments represented diagrammatically in FIGS. 1 and 2.

Although the method, and also the device, according to the invention can be used for cables and for pipes into which a communications cable can be inserted afterwards, reference will be made below only to a cable.

Figure 1:
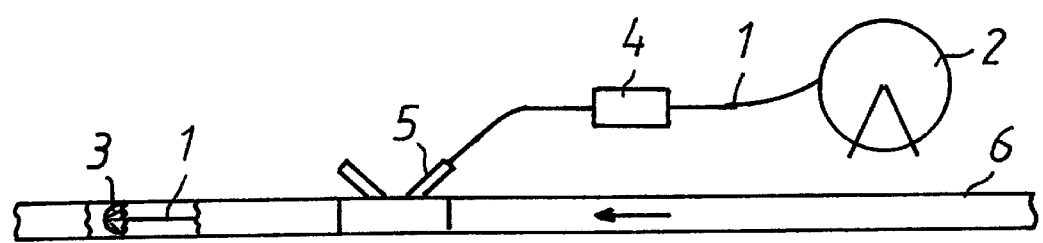

The cable 1 is delivered to the laying location on a reel 2. An umbrella 3 is first of all fastened to the beginning of the cable 1, and the latter is guided through the device 4, which will be described in greater detail below, and introduced into a fresh-water conduit 6 through the extension 5. The drinking water, which is conveyed in the direction of the arrow, expands the umbrella 3, as a result of which the cable 1 is drawn off the reel 2 and laid in the drinking-water conduit 6.

In order to prevent the introduction of dirt, dust or other substances which contaminate the drinking water into the drinking water conduit 6, the cable 1 is intensively cleaned in the device 4 as it runs through the latter.

Figure 2:
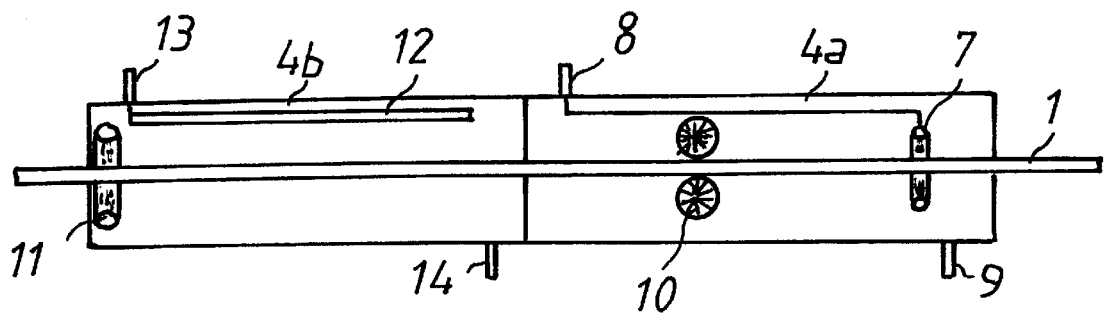

The device 4 consists—see FIG. 2—of a first chamber 4a and a second chamber 4b which have, in each case, an entry aperture and an exit aperture, of which no further details are indicated, for the cable 1 which is transported in the direction of the arrow. The entry and exit apertures have diameters which approximately correspond to the external diameter of the cable 1. Annular seals, which are not represented, on the entry and exit apertures prevent unwanted substances from passing into the interior of the chambers 4a and 4b, and the cleaning agent from passing out. Viewed in the direction of running-through of the cable 1, there is first of all provided, in the chamber 4a, a spraying arrangement 7 which consists of a number of individual spray nozzles, of which no further details are indicated but which are disposed in a manner distributed over the periphery of the cable 1 and with the aid of which a spraying liquid is sprayed at high pressure onto the surface of the said cable 1. The spraying liquid is preferably fresh water, to which suitable solvents for organic substances, such as grease, wax, etc., adhering to the surface of the cable, and also a disinfecting agent are added. The fresh rinsing liquid reaches the spraying arrangement 7 via an inlet 8, and the polluted rinsing liquid passes out of the chamber 4a via the outlet 9.

Disposed behind the spraying arrangement is a brushing device 10 having a number of brushes of which no further details are indicated but which are driven at high speed, are disposed in a manner distributed over the periphery of the cable 1 and remove stubborn dirt from the surface of the cable.

In a variation of the arrangement consisting of the spraying device 7 and the brushing device 10, it is also possible to provide a brushing device, as described, which is driven by a high-pressure water jet which, at the same time, impinges obliquely against the surface of the cable 1.

Located behind the chamber 4a is the chamber 4b, in which there are disposed one or more annular nozzles 11 or a sprinkler pipe 12, which spray fresh water onto the surface of the cable and thus completely remove particles which adhere to the surface of the said cable in spite of the treatment in the chamber 4a. The fresh water fed to the annular nozzle 11 or the sprinkler pipe 12 via the inlet 13 is discharged via the outlet 14.

What is claimed is:

1. Method of laying a cable, or a pipe for the subsequent introduction of a cable, in particular an optical communications cable, in a fresh-water conduit, whereby the surface of the cable or pipe is cleaned during the laying process immediately before entering the fresh-water conduit, wherein the surface of the cable or pipe is cleaned with a jet of liquid which is directed onto the surface of the cable under high pressure.

2. Method according to claim 1, wherein grease-dissolving as well as germicidal agents are added to the liquid, said agents being soluble in water.

3. Method of laying a cable, or a pipe for the subsequent introduction of a cable, in particular an optical communications cable, in a fresh-water conduit, whereby the surface of the cable or pipe is cleaned during the laying process immediately before entering the fresh-water conduit, wherein the surface of the cable or pipe is cleaned with rotating brushes.

4. Method of laying a cable, or a pipe for the subsequent introduction of a cable, in particular an optical communications cable, in a fresh-water conduit, whereby the surface of the cable or pipe is cleaned during the laying process immediately before entering the fresh-water conduit, wherein the surface of the cable or pipe is cleaned with a jet of liquid as well as by brushes.

5. Method of laying a cable, or pipe for the subsequent introduction of cable, in particular an optical communications cable, in a fresh-water conduit, whereby the surface of the cable or pipe is cleaned during the laying process immediately before entering the fresh-water conduit, wherein the surface of the cable or pipe is rinsed with clear water after the cleaning operation.

6. Device for performing the method of laying a cable, or a pipe for the subsequent introduction of a cable, in particular an optical communications cable, in a fresh-water conduit, whereby the surface of the cable or pipe is cleaned during the laying process immediately before entering the fresh-water conduit, the device comprising a housing with at least two chambers each having an entry aperture and an exit aperture for the cable or pipe to be cleaned, the first chamber having means for mechanically cleaning the surface of the cable or pipe and the second chamber having at least one rinsing device.

7. Device according to claim 6, wherein a number of brushes which act on the surface of the cable or pipe and rotate at high speed are disposed in the first chamber.

8. Device according to claim 6, wherein an inlet and an outlet for a cleaning liquid which moistens the surface of the cable or pipe are provided in the first chamber.

9. Device according to claim 8, wherein one or more annular nozzles are provided, which spray the cleaning liquid against the surface of the cable or pipe.

10. Device according to claim 6, wherein an inlet and an outlet for a rinsing liquid are provided in the second chamber.

11. Device according to claim 10, wherein one or more annular nozzles which spray the rinsing liquid onto the surface of the cable or pipe are provided in the second chamber.

* * * * *